United States Patent [19]

Yuzawa et al.

[11] 4,274,385
[45] Jun. 23, 1981

[54] EXHAUST GAS RECIRCULATION SYSTEM FOR INTERNAL COMBUSTION ENGINE

[75] Inventors: Haruo Yuzawa; Tsuneomi Yano, both of Tokyo, Japan

[73] Assignee: Nissan Motor Company, Limited, Japan

[21] Appl. No.: 97,383

[22] Filed: Nov. 26, 1979

[30] Foreign Application Priority Data

Dec. 6, 1978 [JP] Japan ............................ 53-149939

[51] Int. Cl.$^3$ ............................................ F02B 47/08
[52] U.S. Cl. ..................................... 123/571; 123/568
[58] Field of Search ........................ 123/571, 568, 569

[56] References Cited

U.S. PATENT DOCUMENTS

| | | | |
|---|---|---|---|
| 4,163,435 | 8/1979 | Nakajima et al. | 123/571 |
| 4,164,918 | 8/1979 | Haka | 123/571 |
| 4,177,777 | 12/1979 | Maruyama | 123/571 |
| 4,185,607 | 1/1980 | Thornburgh | 123/568 X |
| 4,186,702 | 2/1980 | Day | 123/568 |
| 4,186,703 | 2/1980 | Haka et al. | 123/568 |
| 4,195,531 | 4/1980 | Okamura | 123/571 |
| 4,210,112 | 7/1980 | Nakamura et al. | 123/571 |
| 4,224,909 | 9/1980 | Toyama et al. | 123/568 |

*Primary Examiner*—Wendell E. Burns
*Attorney, Agent, or Firm*—Lane, Aitken, Ziems, Kice & Kananen

[57] ABSTRACT

An exhaust gas recirculation system for an internal combustion engine for automotive use, wherein a diaphragm-operated recirculation rate control valve adapted to control the exhaust gas recirculation rate depending upon the relationship between the pressure of the exhaust gases passed through an orifice and a vacuum developed in the mixture supply system of the engine is used in combination with a solenoid and diaphragm operated vacuum compensating valve which is not only responsive to the pressure of the exhaust gases passed through the orifice but is controlled by a microcomputer responsive to various operational parameters of the engine so that the vacuum to be developed in the recirculation rate control valve is compensated to be optimum for operating conditions of the engine.

17 Claims, 5 Drawing Figures

FIG. I
PRIOR ART

EXHAUST GAS RECIRCULATION SYSTEM FOR INTERNAL COMBUSTION ENGINE

FIELD OF THE INVENTION

The present invention relates in general to internal combustion engines for automotive use and, particularly, to an exhaust gas recirculation system for an automotive internal combustion engine.

BACKGROUND OF THE INVENTION

In some modernized internal combustion engines for automotive vehicles, the exhaust gases once discharged from the power cylinders into the exhaust system of the engine are partially recirculated at controlled rates into the air-fuel mixture system of the engine for thereby controlling the exhaust gas emission. An exhaust gas recirculation system which has been used for this purpose in an internal combustion engine for an automotive vehicle includes a diaphragm-operated exhaust gas recirculation rate control valve adapted to vary the recirculation rate of exhaust gases depending upon the induction rate of air through the mixture supply system of the engine. The induction rate of air through the mixture supply system is usually detected from a vacuum developed in the mixture supply system when the internal combustion engine is in operation.

In an advanced version of a prior-art exhaust gas recirculation system of this nature, the recirculation rate control valve is used in combination with a diaphragm-operated vacuum compensating valve responsive to the pressure of the exhaust gases to be passed through the recirculation rate control valve. The vacuum compensating valve is adapted to supply atmospheric air into the vacuum chamber in the recirculation rate control valve at rates variable with the pressure of the exhaust gases to be passed through the recirculation rate control valve so that the vacuum to act on the diaphragm of the recirculation rate control valve is lessened or compensated on the basis of the pressure of the exhaust gases to be passed through the recirculation rate control valve.

The exhaust gases recirculated from the exhaust system are directed to the recirculation rate control valve through a flow restriction or orifice provided upstream of the valve. When the recirculation rate control valve is in a fully open or nearly fully open condition, the exhaust gas pressure developed between the orifice and the recirculation rate control valve is reduced toward an atmospheric or even subatmospheric level. The reduced exhaust gas pressure or the vacuum thus developed downstream of the orifice acts on the diaphragm of the vacuum compensating valve and causes the valve to supply atmospheric air or increase the supply rate of air to the vacuum chamber of the recirculation rate control valve. This causes the recirculation rate control valve to interrupt the recirculation of exhaust gases or reduce the recirculation rate of exhaust gases therethrough.

As the pressure of the exhaust gases in the exhaust system of the engine increases with an increase in the load on the engine, the exhaust gas pressure developed between the orifice and the recirculation rate control valve and acting on the diaphragm of the vacuum compensating valve is also increased and holds the diaphragm of the vacuum compensating valve in a position interrupting the supply of air to the vacuum chamber of the recirculation rate control valve. Under these conditions, the recirculation rate control valve is operative to control the exhaust gas recirculation rate in accordance with the relationship between the pressure of the exhaust gases passed through the orifice and the vacuum developed in the mixture supply system.

In order to permit exhaust gases to be recirculated at satisfactory rates under conditions in which relatively low exhaust gas pressure occurs upstream of the orifice, it is important that the vacuum compensating valve be designed to be responsive to exhaust gas pressures close to an atmospheric level. For this reason and further by reason of the pulsation in the pressure of the exhaust gases, the exhaust gas recirculation rate achieved is subject to fluctuations and, therefore, can not be controlled accurately insofar as only the pressure of the exhaust gases to be recirculated is utilized as the control signal for the vacuum compensating valve.

Since, furthermore, the exhaust gas recirculation rate is controlled to vary with the exhaust gas pressure proportional to the induction rate of air through the mixture supply system of the engine, the resultant recirculation rate is inevitably maintained in the vicinity of a certain fixed value for different modes of operation of the engine, causing reduction in the total performance efficiency of the engine under various operating conditions thereof. It may also be pointed out that meticulous design considerations and high production accuracy are required for the design and engineering of the vacuum compensating valve which is required to be responsive to extremely low exhaust gas pressures as above discussed.

The present invention contemplates elimination of these drawbacks which have been inherent in a prior-art exhaust recirculation system of the described nature.

SUMMARY OF THE INVENTION

In accordance with the present invention, there is provided an exhaust gas recirculation system for an internal combustion engine having an air-fuel mixture supply system and an exhaust system, comprising exhaust gas recirculation passageway means for providing communication between the exhaust system and the mixture supply system of the engine, an exhaust recirculation rate control valve assembly provided in the passageway means, the passageway means including a flow restriction located between the valve assembly and the exhaust system of the engine, vacuum passageway means for providing communication between the mixture supply system of the engine and the above mentioned valve assembly for introducing into the valve assembly a vacuum developed in the mixture supply system during operation of the engine, the valve assembly being responsive to the vacuum developed therein and being operative to control the recirculation rate of exhaust gases therethrough depending upon the relationship between the vacuum developed in the valve assembly and the exhaust gas pressure developed in the recirculation passageway means between the aforesaid flow restriction and valve assembly, a vacuum compensating valve assembly comprising a stationary solenoid unit, a valve element movable between a first position providing communication between the aforesaid vacuum passageway and the open air and a second position blocking the above mentioned communication, the valve element being moved between the first and second positions as the solenoid unit is energized and deenergized, and a flexible diaphragm deformable in response to the exhaust gas pressure developed in the recirculation passageway means between the flow restriction and the recirculation rate control valve assembly, the diaphragm being engageable with the valve element for forcing the valve element to stay in the first position thereof when the exhaust gas pressure acting on the diaphragm is at a subatmospheric level, and a microcomputer electrically connected to the solenoid unit and responsive to variation in prescribed operational parameters of the engine for energizing and de-energizing the solenoid unit in accordance with the variation in these parameters. The vacuum compensating valve assembly may further comprise a detaining member movable with the diaphragm and engageable with the valve element of the compensating valve assembly, the detaining member being disengaged from the valve element when the exhaust gas pressure acting on the diaphragm is at a positive level.

DESCRIPTION OF THE DRAWINGS

The features and advantages of an exhaust gas recirculation system according to the present invention over a prior-art exhaust gas recirculation system will be more clearly appreciated from the following description taken in conjunction with the accompanying drawings, in which.

DETAILED DESCRIPTION OF THE PRIOR ART

Figure 1:
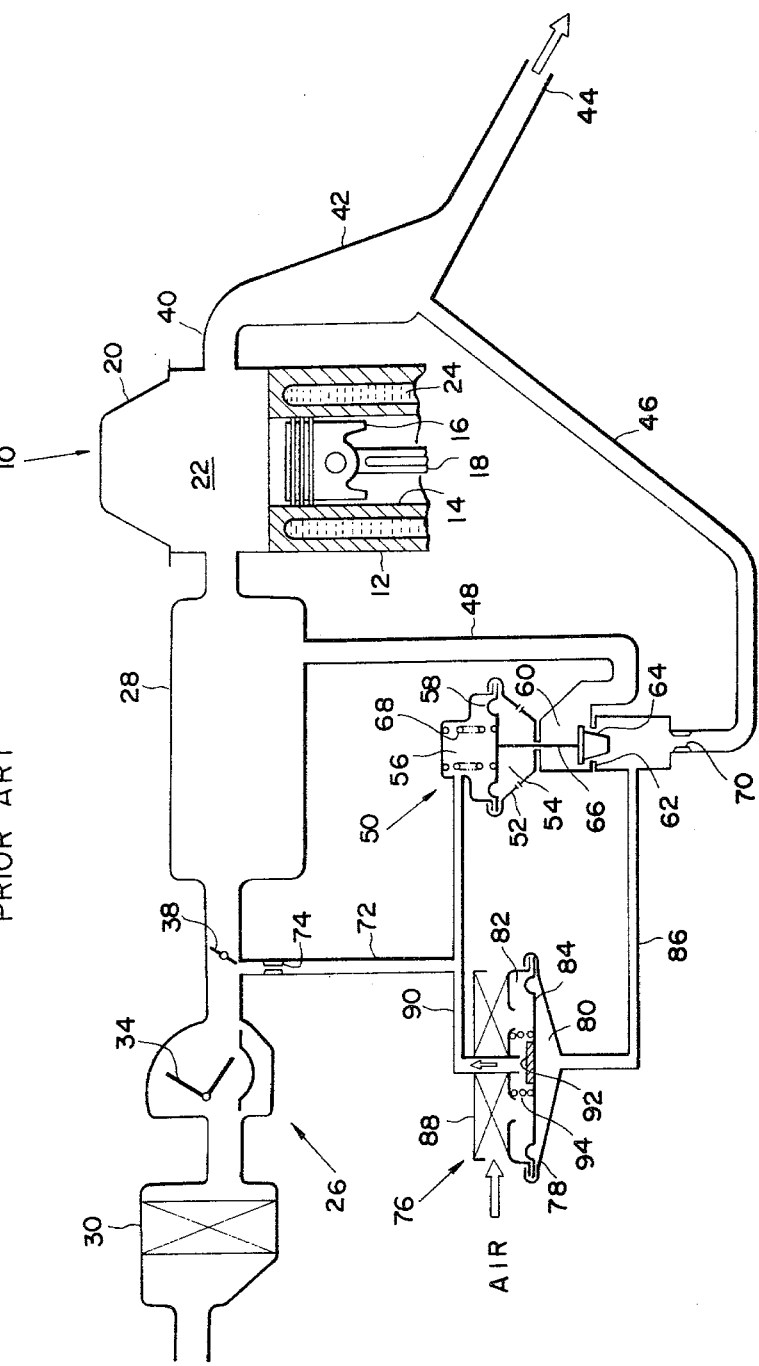
FIG. 1 is a schematic view showing in section a representative example of a prior-art exhaust gas recirculation system for an internal combustion engine.

Referring to FIG. 1 of the drawings, an automotive internal combustion engine equipped with a prior-art exhaust gas recirculation system is schematically shown comprising a power cylinder 10 having a cylinder block 12 formed with a cylinder bore 14. A reciprocating piston 16 is axially movable back and forth in the cylinder bore 14 and is coupled to an engine crankshaft (not shown) by a connecting rod 18. The cylinder block 12 is topped by a cylinder head 20 defining a variable-volume combustion chamber 22 between the cylinder head 20 and the upper end face of the reciprocating piston 16. The internal combustion engine is herein assumed to be of the water cooled type and, thus, the cylinder block 12 is shown formed with a cooling water jacekt 24 through which cooling water for the power cylinder 10 is to be circulated during operation of the engine, as is well known in the art.

The internal combustion engine shown in FIG. 1 is assumed to be of the fuel injection type by way of example and, thus, further comprises a mixture supply system largely consisting of an air intake assembly 26 and an intake manifold 28. The air intake assembly 26 in turn comprises an air cleaner 30 open to the atmosphere, and a throttle valve 38 located intemediate between the air cleaner 30 and the intake manifold 28. The throttle valve 38 is linked to an accelerator pedal (not shown) of an automotive vehicle for being moved between the fully open and minimum open positions thereof as the accelerator pedal is depressed.

The intake manifold 28 leading from the air intake assembly 26 thus constructed generally consists essentially of a plurality of induction passageway each of which is communicable with the combustion chamber 22 of the power cylinder 10 across an intake valve (not shown) provided in, for example, the cylinder head 20. The combustion chamber 22 of the power cylinder 10 in turn is communicable with an exhaust manifold 40 across an exhaust valve (not shown) provided in for example, the cylinder head 20. The exhaust manifold 40 forms part of an exhaust system which further includes an exhaust pipe 42 leading from the exhaust manifold 40 and having a muffler or mufflers (not shown) incorporated therein, and a tail pipe 44 leading from the exhaust pipe 42 and open to the atmosphere at its leading end. The mixture supply and exhaust systems of automotive engines being well known per se, detailed description regarding the construction and operation of such systems will not be herein incorporated to avoid prolixity of description.

The exhaust gas recirculation system provided for the internal combustion engine thus constructed comprises an exhaust gas recirculation passageway 46 leading from a suitable portion such as, for example, the exhaust pipe 42 as shown of the exhaust system and an exhaust gas feed passageway 48 leading to a suitable portion such as, for example, the intake manifold 28 as shown of the mixture supply system. Between the exhaust gas recirculation passageway 46 and the exhaust gas feed passageway 48 is provided a vacuum-responsive, exhaust recirculation rate control valve assembly 50 adapted to control the recirculation rate of exhaust gases to the mixture supply system depending upon a vacuum developed in the mixture supply system. The recirculation rate control valve assembly 50 comprises a casing 52 which is internally divided into a variable-volume atmospheric chamber 54 and a variable-volume vacuum chamber 56 by a flexible diaphragm 58 which is secured along its perimeter to the casing 52. The valve casing 52 is further formed with a valve chamber 60 which is contiguous on one hand to the exhaust gas chamber 54 and on the other hand to the exhaust gas recirculation passageway 46 across an annular valve seat member 62 which is fixedly positioned between the exhaust gas recirculation passageway 46 and the valve chamber 60. The valve chamber 60 is open to the exhaust gas feed passageway 48 and is in constant communication with the intake manifold 28 of the engine. The atmospheric chamber 54 is open to the atmosphere through a breather port formed in the casing 52 and is hermetically isolated from the valve chamber 60 by a suitable sealing element (not shown) provided between the chambers 54 and 60.

A conical valve element 64 is axially movable through the aperture in the annular valve seat member 62 and is securely connected to the diaphragm 58 by a valve stem 66 axially extending through the atmospheric chamber 54 and the valve chamber 60 from the diaphragm 58. The conical valve element 64 is thus continuously movable with the diaphragm 58 into and out of an axial position fully closing the aperture in the valve seat member 62. The valve element 64 is urged to move toward such an axial position by means of a preloaded helical compression spring 68 positioned within he vacuum chamber 56 and seated at one end on the diaphragm 58 and at the other end on the casing 52 as shown. The exhaust gas recirculation passageway 46 is provided with a flow metering orifice 70 located upstream of the valve chamber 60 thus arranged. The vacuum chamber 56 of the exhaust recirculation rate control valve assembly 50 is in constant communication with the mixture supply system through a vacuum passageway 72 which is open into the mixture supply system in close proximity to or otherwise slightly upstream of an edge portion of the throttle valve 38 in the previously mentioned minimum open or idling position thereof. The vacuum passageway 72 is provided with a flow restricting orifice 74.

The exhaust gas recirculation system further comprises a vacuum compensating valve assembly 76 for compensating the vacuum to be developed in the vacuum chamber 56 of the above described recirculation rate control valve assembly 50. The vacuum compensating valve assembly 76 comprises a valve casing 78 which is internally divided into a variable-volume exhaust gas chamber 80 and a variable-volume atmospheric chamber 82 by a flexible diaphragm 84 which is secured along its perimeter to the valve casing 78. The exhaust gas chamber 80 is in constant communication with the exhaust gas recirculation passageway 46 downstream of the orifice 70 through an exhaust gas passageway 86, while the atmospheric chamber 82 is open to the atmosphere through an air cleaner unit 88 attached to the valve casing 78.

An air passageway 90 which is open at one end in the atmospheric chamber 82 communicates with the vacuum passageway 72 and is open at the other end between the orifice 74 and the vacuum chamber 56 of the recirculation rate control valve assembly 50. The vacuum compensating valve assembly 76 further comprises a generally disc-shaped valve element 92 securely attached to one face of the diaphragm 84 for being movable with the diaphragm 84 into and out of an axial position fully closing the open end of the air passageway 90. The valve element 92 is urged to move toward such an axial position by means of a preloaded helical compression spring 94 positioned within the atmospheric chamber 82 and seated at one end on the diaphragm 94 and at the other end on the valve casing 78.

When the engine is in operation with an increasing load applied thereto, the pressure of the exhaust gases in the exhaust system and accordingly the exhaust gas pressure developed in the exhaust gas recirculation passageway 46 downstream of the orifice 70 increase as the load on the engine increases. When the exhaust gas pressure developed in the exhaust gas chamber 80 of the vacuum compensating valve assembly 76 through the exhaust gas passageway 86 rises beyond a certain value which is determined by the atmospheric pressure and the force of the compression spring 94 acting on the diaphragm 84 of the valve assembly 76, the force resulting from the exhaust gas pressure acting on the diaphragm 84 overcomes the opposing forces exerted on the diaphragm 84 by the atmospheric pressure and the spring 94 and causes the diaphragm 84 to move in a direction to expand the exhaust gas chamber 80. The valve element 92 on the diaphragm 84 is thus moved into the axial position fully closing the open end of the air passageway 90 against the force of the spring 94. The vacuum passageway 72 being isolated from the atmospheric chamber 82 of the vacuum compensating valve assembly 76, the vacuum developed in the vicinity of the throttle valve 38 is permitted to extend through the vacuum passageway 72 into the vacuum chamber 56 of the recirculation rate control valve assembly 50 without being reduced by an atmospheric pressure. Under these conditions, the exhaust recirculation rate control valve assembly 50 controls the flow rate of exhaust gases past the valve element 64 depending upon the relationship between the force of the compression spring 68 and the vacuum developed in the vacuum chamber 56. The exhaust gases recirculated from the exhaust pipe 42 into the exhaust gas recirculation passageway 46 and metered by the orifice 70 are, thus, permitted to flow through the valve chamber 60 and the exhaust gas feed passageway 48 into the intake manifold 28 of the engine at a rate continuously variable with the vacuum developed in the vicinity of the throttle valve 38 when the engine is operating with relatively high loads.

Since, in this instance, a vacuum developed in the mixture supply system is largely proportional to the flow rate of the air being passed through the air intake assembly 26, exhaust gases are recirculated into the power cylinder 10 at a rate which is largely proportional to the rate at which air is inducted through the air intake assembly 26. The flow of exhaust gases from the exhaust gas recirculation passageway 46 to the exhaust gas feed passageway 48 is restricted by the orifice 70. If, therefore, the flow rate of exhaust gases past the valve element 64 of the recirculation rate control valve assembly 50 increases beyond a certain value, the exhaust gas pressure directed past the orifice 70 and through the exhaust gas passageway 86 into the exhaust gas chamber 80 of the vacuum compensating valve assembly 76 is reduced to such a value that can not overcome the opposing forces exerted on the diaphragm 84 and allows the diaphragm 84 to move with the valve element 92 away from the open end of the air passageway 72. The air passageway 72 being thus allowed to be open into the atmospheric chamber 82, the atmospheric air admitted through the air cleaner unit 88 into the atmospheric chamber 82 is passed by way of the air passageway 90 and further through the vacuum passageway 72 into the vacuum chamber 56 and causes reduction of the vacuum developed in the vacuum chamber 56. This in turn causes the valve element 64 to move in a direction to close the aperture in the valve seat member 62 or reduce the open area of the aperture in the valve seat member 62, thereby lessening the recirculation of exhaust gases to the intake manifold 28. When the exhaust gas pressure developed in the exhaust gas recirculation passageway 46 downstream of the orifice 70 restores a certain value, the valve element 92 of the vacuum compensating valve assembly 76 is for a second time moved into the axial position closing the open end of the air passageway 90. The valve element 64 of the exhaust recirculation rate control valve assembly 50 is now moved to enlarge the open area of the aperture in the valve seat member 62 or permit the aperture in the valve seat member 62 to be fully open, thereby reopening the recirculation of exhaust gases or giving rise to an increase in the exhaust gas recirculation rate.

Thus, the exhaust gas recirculation rate achieved in the system hereinbefore described varies with the difference between the gas pressure developed upstream of the orifice 70 and the gas pressure developed downstream of the orifice 70. In order to achieve satisfactory recirculation of exhaust gases under conditions in which relatively low gas pressures occur in the exhaust gas recirculation passageway 46, the vacuum compensating valve assembly 76 is usually designed in such a manner that the air passageway 90 is allowed to be open only when the exhaust gas pressure directed past the orifice 70 into the exhaust gas chamber 80 of the valve assembly 76 is lower than a level close to the level of the atmospheric pressure.

It therefore follows that the exhaust gas recirculation rate in an internal combustion engine arranged as illustrated in FIG. 1 is subject to fluctuations due to the pulsation in the pressure of exhaust gases and, for this reason, can not be controlled properly insofar as only the pressure of the exhaust gases to be recirculated is utilized as the control signal for the vacuum compensating valve assembly 76. Because, furthermore, of the fact that the exhaust recirculation rate is controlled to vary with the exhaust gas pressure proportional to the air induction rate through the air intake assembly, the exhaust gas recirculation rate is inevitably maintained in the vicinity of a certain fixed value for different modes of operation of the engine. This causes reduction in the total performance efficiency of the engine under various operating conditions thereof. On the other hand, meticulous design considerations and high production accuracy are indispensable for the designing and engineering of the vacuum compensating valve 76 which is required to be responsive to an extremely low exhaust gas pressure close to the atmospheric pressure.

Where, furthermore, it is desired to have exhaust gases recirculated at increased rates throughout various modes of operation of the internal combustion engine, the exhaust gas recirculation system for the engine must be designed and engineered so that the exhaust gas recirculation and feed passageways 46 and 48 as well as the orifice 70 in the passageway 46 have increased effective cross sectional areas. This apparently results in an increase in the production cost and a decrease in the production efficiency of the exhaust gas recirculation system.

The present invention contemplated provision of a useful solution to these problems thus far encountered in prior-art exhaust gas recirculation systems of the described type. For this purpose, the present invention proposes to improve the vacuum compensating valve assembly 76 in such a manner that the valve assembly is capable of interrupting the passage of atmospheric air therethrough under predetermined conditions of the engine and continuously varying the flow rate of air therethrough in response to variation in predetermined operational parameters of the engine.

DESCRIPTION OF THE PREFERRED EMBODIMENT

Figure 2:
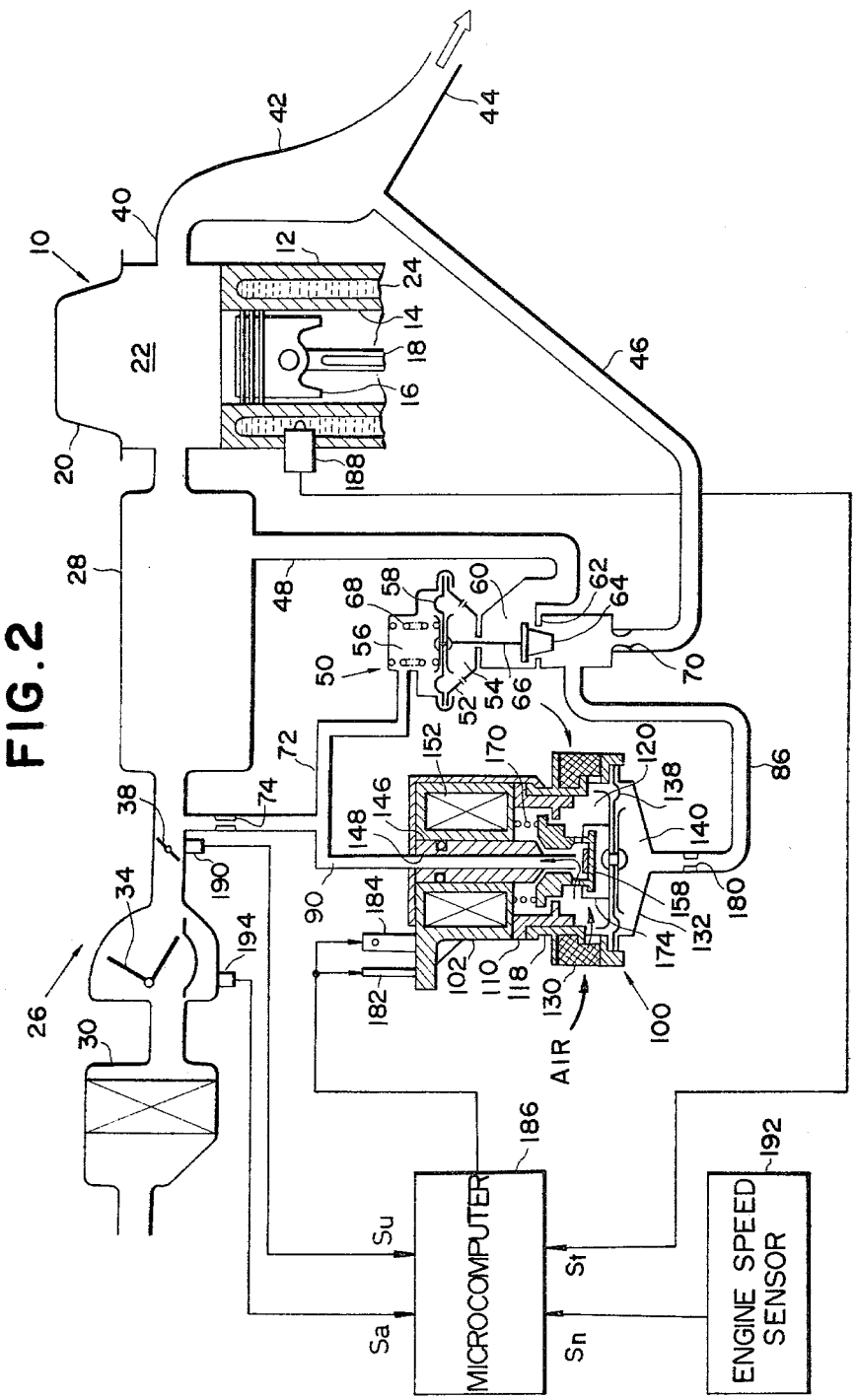
FIG. 2 is a view similar to FIG. 1 but shows a preferred embodiment of an exhaust gas recirculation system according to the present invention.
Figure 3:
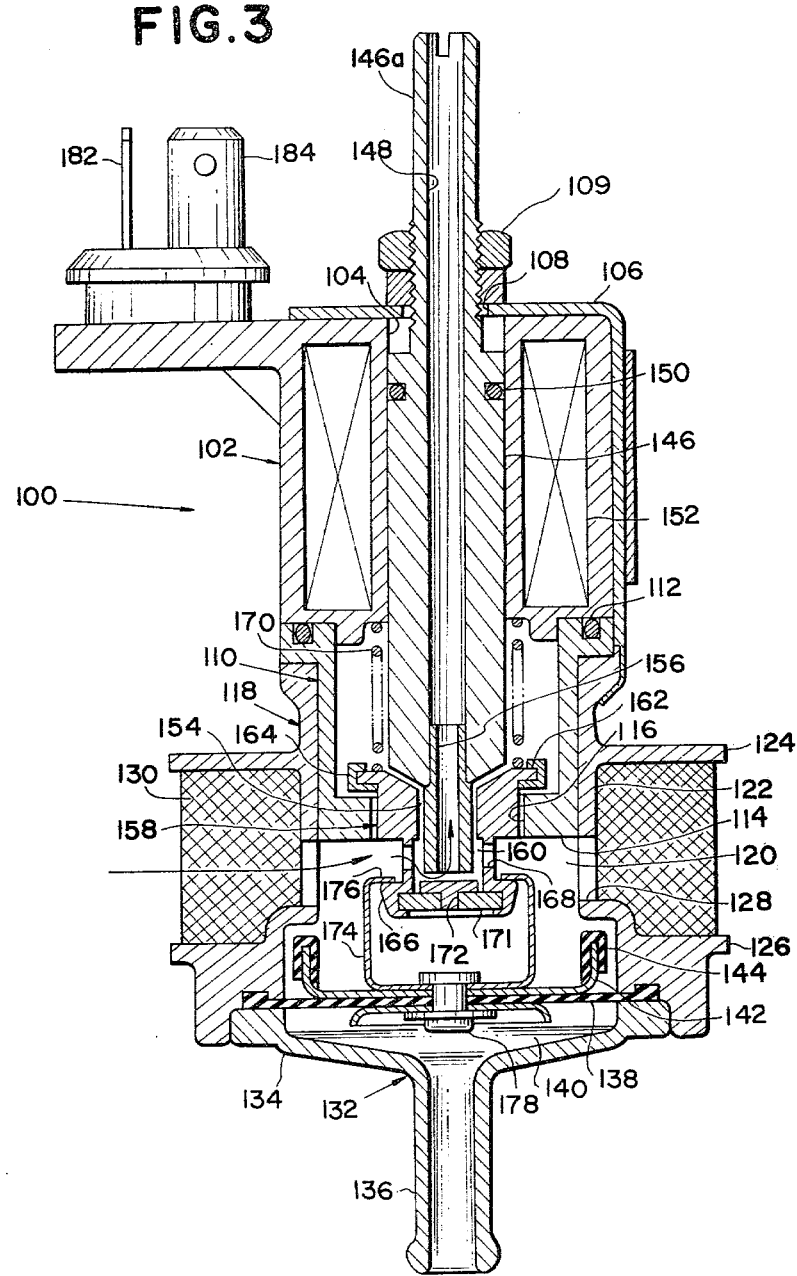
FIG. 3 is a sectional view showing, to an enlarged scale, the detailed construction of the vacuum compensating valve assembly forming part of the exhaust gas recirculation system illustrated in FIG. 2.

Referring to FIGS. 2 and 3 of the drawings, such a vacuum compensating valve assembly embodying the present invention is designated in its entirety by reference numeral 100 and is shown comprising a casing structure including a generally cylindrical solenoid housing 102 formed with an axial bore 104. An outer shell member 106 having an opening 108 therein is fixedly attached to the solenoid housing 102 in such a manner that the opening 108 is located adjacent to the axially outer end of the bore 104 in the solenoid housing 102. The casing structure of the valve assembly 100 further includes a generally cylindrical valve housing 110 fixedly attached at one axial end to the inner axial end face of the solenoid housing 102 with an annular seal element 112 interposed therebetween. The seal element 112 is shown to be press fitted in an annular groove formed in a flanged end portion of the valve housing 110 and is closely contacted by the inner axial end face of the solenoid housing 102. The valve housing 110 has an annular end wall portion 114 axially spaced apart from the inner axial end of the solenoid housing 102 and formed with an opening 116 having a center axis substantially aligned with the center axis of the axial bore 104 in the solenoid housing 102.

To the outer peripheral surface of the valve housing 110 thus arranged is fixedly attached a diaphragm support member 118 formed with a generally cylindrical and axially stepped axial bore 120 contiguous to the outer end face of the annular end wall portion 114 of the valve housing 110 as shown. The diaphragm support member 118 has a cylindrical intermediate wall portion 122 and two annular flange portions 124 and 126 radially projecting outwardly from the intermediate wall portion 122 and axially spaced apart from each other. The intermediate wall portion 122 of the diaphragm support member 118 is formed with a suitable number of openings 128 which are arranged circumferentially of the wall portion 122. Between the flange portions 124 and 126 of the diaphragm support member 118 is interposed an annular air filter unit 130 surrounding the cylindrical intermediate wall portion 122 of the support member 118. Thus, the axial bore 120 in the diaphragm support member 118 is in constant communication with the open air through the openings 128 in the intermediate wall portion 122 of the support member 118 and the air filter unit 130 surrounding the wall portion 122. The casing structure of the valve assembly 100 further includes a diaphragm retainer 132 having a dished flange portion 134 and a tubular lug portion 136 axially projecting from the flange portion 134 as shown. The flange portion 134 is securely attached to the annular flange portion 126 of the diaphragm support member 118.

A flexible diaphragm 138 is closely received along its entire peripheral end between the flange portion 126 of the diaphragm support member 118 and the flange portion 134 of the diaphragm retainer 132. The diaphragm 138 forms on one side thereof a variable-volume atmospheric chamber constituted by the above described axial bore 120 in the diaphragm support member 118 and on the other side thereof a variable-volume exhaust gas chamber 140 which is defined between the diaphragm 138 and the flange portion 134 of the diaphragm retainer 132. To the inner face of the diaphragm 138 is securely attached a dished disc member 142 having an axially turned rim portion wrapped in a resilient, annular cushion element 144. When the diaphragm 138 is axially deformed toward the annular end wall portion 114 of the valve housing 110, the dished disc member 142 thus attached to the diaphragm 140 is brought into axially abutting engagement with an annular internal ledge portion of the diaphragm support member 118 and prevents further and excessive displacement or deformation of the diaphragm 138.

The vacuum compensating valve assembly 100 shown in FIGS. 2 and 3 further comprises an elongated magnetic core member or rod 146 axially projecting through the bore 104 in the solenoid housing 102 into the open space in the valve housing 110 and formed with an axial bore 148 extending throughout the length of the rod 146. The magnetic core rod 146 has a partially threaded axial extension 146a projecting outwardly from the solenoid housing 102 through the opening 108 in the outer shell member 106 and is securely but adjustably coupled to the solenoid housing 102 by suitable fastening means such as a nut 109 attached to the outer shell member 106 and having the threaded portion of the axial extension 146a screwed therethrough. Between the magnetic core rod 146 and the inner peripheral surface of the solenoid housing 102 is provided an annular seal element 150 which is shown fitted in an annular groove formed in the core rod 146. The magnetic core rod 146 forms part of a solenoid unit which further comprises a solenoid coil 152 which is incorporated in the solenoid housing 102 and which is helically wound in substantially coaxial relationship to the axial bore 104 in the solenoid housing 102 around an axial portion of the core rod 146. The core rod 146 is shown to have a frusto-conical annular end face at its inner axial end.

The magnetic core rod 146 thus arranged has at its inner axial end a tubular valve seat element 154 axially projecting from the inner axial end of the core rod 146 into the atmospheric chamber 120 in the diaphragm support member 118 and in part securely fitted into the axial bore 148 in the core rod 146. The valve seat element 154 has an axial bore 156 which is open at one end into the atmospheric chamber 120 in the diaphragm support member 118 and at the other end into the axial bore 148 in the core rod 146. The valve seat element 154 is preferably constructed of a non-magnetic rigid material.

Between the previously described diaphragm 138 and the magnetic core rod 146 thus arranged is positioned a plunger 158 constructed of a ferromagnetic material and formed with an axial bore 160 which is open at one end to the space in the valve housing 110. The plunger 158 largely consists of a generally ring-shaped body portion axially movable through the opening 116 in the annular end wall portion 114 of the valve housing 110, and a generally cylindrical stem portion axially projecting from the body portion into the atmospheric chamber 120 in the diaphragm support member 118. The body portion of the plunger 158 has at its end projecting into the space in the valve housing 110 and annular flange 162 circumferentially extending adjacent the inner end face of the annular end wall portion 114 of the valve housing 110. The flange 62 of the body portion of the plunger 158 is wrapped in or covered with an annular cushion element 164 as shown and is, thus, softly moved into axially abutting engagement with the end face of the annular end wall portion 114 of the valve housing 110 across the cushion element 164 when the plunger 158 is axially moved away from and toward the inner axial end of the magnetic core rod 146. On the other hand, the stem portion of the plunger 158 has at its end projecting into the atmospheric chamber 120 in the diaphragm 138 an annular flange 166 which is axially spaced apart from the body portion of the plunger 158. The stem portion of the plunger 158 further has a suitable number of apertures 168 formed therein for providing communication between the atmospheric chamber 120 in the diaphragm support member 118 and the axial bore 160 in the plunger 158. The body portion of the plunger 158 has a frusto-conically dished end face substantially conforming to the frusto-conical annular end face of the magnetic core rod 146 and can be snugly seated on the end face of the core rod 146 when the plunger 158 is axially moved toward the core rod 146. Thus, the plunger 158 is movable between a first axial position seated on the inner end face of the annular end wall portion 114 of the valve housing 110 across the cushion element 164 and a second axial position seated on the frusto-conical annular end face of the magnetic core rod 146. The plunger 158 is urged to move toward the first axial position thereof by suitable biasing means such as a preloaded helical compression spring 170 seated at one end on the outer end face of the flange 162 of the plunger 158 and at the other end thereof on the inner end face of the solenoid housing 102 as shown.

The flange 166 of the stem portion of the plunger 158 has securely attached thereto an annular valve retainer element 171. A disc-shaped valve element 172 is fixedly mounted on the inner end face of the valve retainer element 171 and is axially movable with the plunger 158 into and out of a position closing the axial bore 156 in the valve seat element 154 at the leading end of the valve seat element 154. When the plunger 158 assumes the first axial position thereof, the valve element 172 supported thereof allows the axial bore 156 in the valve seat element 154 to be open to the axial bore 160 in the plunger 158 and provides communication between the atmospheric chamber 120 in the diaphragm support member 118 and the axial bore 148 in the magnetic core rod 146 through the apertures 168 and the axial bore 160 in the plunger 158 and the axial bore 156 in the valve seat element 154. Such communication is blocked when the plunger 158 is moved into the second axial position thereof and causes the valve element 172 to close the axial bore 156 in the valve seat element 154.

On the dished disc member 142 on the diaphragm 138 is securely attached a generally cylindrical plunger detaining member 174 axially projecting toward the annular end wall portion 114 of the valve housing 110. The plunger detaining member 174 has an annular end portion 176 radially turned inwardly and circumferentially extending within the groove between the body portion and the flange 166 of the stem portion of the plunger 158 so as to be engageable along its inner face with the annular inner end face of the flange 166 of the plunger 158. The diaphragm 138, disc member 142 and plunger detaining member 174 are fastened together by means of a pin 178 as shown.

As illustrated in FIG. 2, the exhaust gas chamber 140 formed between the diaghragm 138 and the dished flange portion 134 of the diaphragm retainer 132 communicates through the passageway in the tubular lug portion 136 of the diaphragm retainer 132 with the exhaust gas passageway 86 branched from the exhaust gas recirculation passageway 46 downstream of the orifice 70. In the arrangement shown in FIG. 2, the exhaust gas passageway 86 thus extending between the exhaust gas recirculation passageway 46 and the exhaust gas chamber 140 of the vacuum compensating valve assembly 100 is provided with a calibrated, flow metering orifice 180. On the other hand, the axial bore 148 in the magnetic core rod 146 of the vacuum compensating valve assembly 100 communicates with the vacuum passageway 72 which is shown in FIG. 2 as being open into the air intake assembly 26 downstream of the throttle valve 38. If desired, the vacuum passageway 72 may be arranged to lead from a suitable portion of the intake manifold 28.

The solenoid coil 152 of the vacuum compensating valve assembly 100 thus constructed and arranged is electrically connected through terminals 182 and 184 to a microcomputer diagrammtically indicated at reference numeral 186 in FIG. 2. The microcomputer 186 has input terminals connected to suitable sources of signals indicative of various operational conditions of an internal combustion engine. In the embodiment of the present invention, these signal sources are assumed to include an engine temperature sensor 188 for detecting engine temperature and producing an output signal St representative of the detected engine temperature, a throttle valve position sensor 190 for detecting the opening degree of the throttle valve 38 in the air intake assembly 26 and producing an output signal Sv representative of the detected opening degree of the throttle valve 38, an engine speed sensor 192 for detecting engine speed and producing an output signal Sn representative of the detected engine speed, and an air induction rate sensor 194 for detecting the induction rate of air into the engine and producing an output signal Sa representative of the detected air induction rate. In the arrangement illustrated in FIG. 2, the engine temperature sensor 188 is shown as projecting into the cooling water jacket 24 of the cylinder block 12 of the engine for producing the signal St through detection of the temperature of the engine cooling water in the water jacket 24. On the other hand, the induction rate sensor 194 is shown arranged in association with an air flow meter 34 provided in the air intake assembly 26 upstream of the throttle valve 38 and is operative to produce the signal Sa upon detection of the flow rate of air Q per unit time past the air flow meter 34. Furthermore, the engine speed sensor 192 is assumed by way of example to be adapted to produce the signal Sn through detection of the number of revolutions N per unit time of the output shaft (not shown) of the engine.

Figure 4:
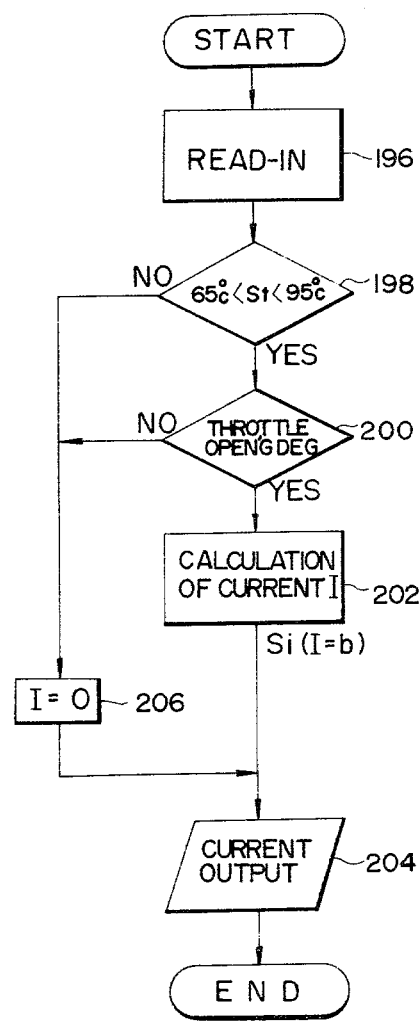
FIG. 4 is a flow chart showing the functions of the microcomputer incorporated in the exhaust gas recirculation system illustrated in FIG. 3.

FIG. 4 illustrates in the form of a flowchart a preferred example of the basic circuit arrangement of the microcomputer 186 to be operative on these signals St, Sv, Sn and Sa.

Referring to FIG. 4, the microcomputer 186 comprises a read-in circuit 196 having input terminals connected to the above described sensors 180, 190, 192 and 194 of the signals St, Sv, Sn, and Sa, respectively, for reading in the pieces of information represented by these signals. The pieces of information thus collected by the read-in circuit 196 are fed to series connected first and second decision gate circuits 198 and 200. The first decision gate circuit 198 is operative to determine whether or not the engine temperature originally represented by the signal St supplied from the engine temperature sensor 186 shown is FIG. 2 is within a predetermined range of, for example, between 65½ C. and 95½ C. If, in this instance, the answer is in the affirmative "YES", viz., if the detected engine temperature is higher than 65½ C. and lower than 95½ C., the pieces of information delivered from the read-in circuit 196 are passed through the first decision gate circuit 198 to the second decision gate circuit 200. The second decision gate circuit 200 is adapted to determine whether or not the opening degree of the throttle valve 38 (FIG. 2) is larger than a predetermined value which may be close to the opening degree of the throttle valve in a minimum open or idling position thereof. If the answer is in the affirmative "YES", viz., the detected opening degree of the throttle valve is larger than the predetermined value, the pieces of information fed to the second decision gate circuit 200 are further passed to an arithmetic circuit 202.

Figure 5:
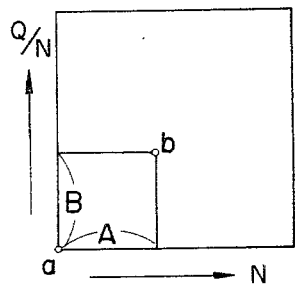
FIG. 5 is a diagram showing an example of the program for calculating the value of current in the microcomputer shown in FIG. 4.

The arithmetic circuit 202 is responsive to the pieces of information representative of the detected number of revolutions N originally represented by the signal Sn and the detected air induction rate Q originally represented by the signal Sa. On the basis of these parameters, the arithmetic circuit 202 calculates the value I of the current to be delivered to the solenoid unit of the vacuum compensating valve assembly in terms of a value A which is equal to one sixteenth of the detected number of revolutions N of the engine and a value B which is given as one sixteenth of the air induction rate Q per single revolution of the engine output shaft. In this instance, the value I of the current may be chosen from a data table formulated on orthogonal coordinates having the engine speed N on the axis of abscissa graduated into 16 divisions and the air induction rate Q per single revolution of the engine output shaft taken on the axis of ordinate graduated into 16 divisions, as indicated in FIG. 5. If, in this instance, the value of current at the origin of the coordinates is assumed to be a, then the value I of the current to be obtained may be given by b=A+16B. If the value b thus obtained is situated intermediate between the numbers tabulated on the table data, then one of the four numbers surrounding the point which may correspond to the number b should be selected as the value I. From the arithmetic circuit 202 is thus delivered a signal Si representative of the value I of the current to be supplied to the solenoid unit of the vacuum compensating valve assembly. The signal Si is fed to a terminal circuit 204 adapted to produce a current proportional to the value I.

If, on the other hand, the answer to the pieces of information supplied to the first decision gate circuit 198 is in the negative "NO", viz., the detected engine temperature is lower than 65½ C. or higher than 95½ C. as when the engine is cooled down excessively or overheated, the terminal circuit 204 is commanded through a bypass circuit 206 to interrupt the supply of current to the solenoid unit of the vacuum compensating valve assembly. If, furthermore, the detected engine temperature is within the range of between 65½ C. and 95½ C. but the detected opening degree of the throttle valve is smaller than the predetermined value, the answer to the pieces of information supplied to the second decision gate circuit 200 is in the negative "NO" so that the terminal circuit is also commanded through the bypass circuit 206 to interrupt the supply of current to the solenoid unit of the vacuum compensating valve assembly.

Under conditions in which the supply of current from the terminal circuit 204 of the microcomputer 186 thus arranged is interrupted, the solenoid coil 152 of the vaccum compensating valve assembly 100 illustrated in FIGS. 2 and 3 is maintained de-energized so that there is no magnetic field induced by the magnetic core rod 146. As a consequence, the plunger 158 positioned between the core rod 146 and the diaphragm 138 is seated by the force of the compression spring 170 on the inner end face of the annular end wall portion 114 of the valve housing 110 across the elastic cushion element 164 with the result that the valve element 172 mounted on the plunger 158 is spaced apart from the leading end of the tubular valve element 154 fitted to the magnetic core rod 146. The valve element 172 being thus disengaged from the valve element 154, the valve element 154 is allowed to remain open at its leading end in the axial bore 160 in the plunger 158 and establishes communication between the atmospheric chamber 120 in the diaphragm support member 118 and the axial bore 148 in the magnetic core rod 146 through the apertures 168 and axial bore 160 in the plunger 158 and the axial bore 156 in the valve element 154. The air admitted through the air filter unit 130 into the atmospheric chamber 120 of the vacuum compensating valve assembly 100 is therefore allowed to reach the vacuum passageway 72 leading from the air intake assembly 26 to the vacuum chamber 56 of the exhaust recirculation rate control valve assembly 50 illustrated in FIG. 2. The atmospheric air thus introduced into the vacuum chamber 56 of the valve assembly 50 reduces the vacuum in the vacuum chamber 56 and causes the valve element 64 to move in the direction to close the aperture in the valve seat member 62 or reduce the open area of the aperture in the valve seat member 62, thereby interrupting or reducing the recirculation rate of exhaust gases to the intake manifold 28.

Thus, the recirculation of exhaust gases to the mixture supply system is interrupted or reduced when the detected engine temperature is lower than 65½ C. or higher than 95½ C. or when the detected engine temperature is within the range of between 65½ C. and 95½ C. but the throttle valve 38 in the air intake assembly 26 is in an idling position producing an opening degree smaller than the predetermined value.

When, on the other hand, the arithmetic circuit 202 of the microcomputer 186 illustrated in FIG. 4 is in a condition producing a signal Si representative of a current having a value I, the terminal circuit 204 of the microcomputer 186 delivers a current proportional to the value I to the solenoid coil 152 of the vacuum compensating valve assembly 100 shown in FIGS. 2 and 3. Under these conditions, a magnetic field proportional to the intensity of the current applied to the solenoid coil 152 is induced by the magnetic core rod 146 of the valve assembly 100 and forces the plunger 158 to axially move toward the core rod 146 against the opposing force of the compression spring 170 and is seated on the frusto-conical annular end face of the core rod 146. The valve element 172 mounted on the plunger 158 is now moved into the position closing the tubular valve element 154 at the leading end thereof and blocks the communication between the atmospheric chamber 120 and the axial bore 148 in the magnetic core rod 146. In the absence of atmospheric air in the air passageway 90 leading to the vacuum passageway 72, the exhaust recirculation rate control valve assembly 50 permits exhaust gases to be recirculated to the mixture supply system at a rate which varies with the relationship between the exhaust gas pressure and intake manifold vacuum acting on the diaphragm 58 of the valve assembly 50.

When the exhaust recirculation rate control valve assembly 50 is in a condition allowing the aperture in the valve seat member 62 to be fully open and thus providing a maximum flow rate of exhaust gases through the valve assembly 50, there is created a subatmospheric pressure in the exhaust gas passageway 46 downstream of the orifice 70. A vacuum is therefore developed in the exhaust gas chamber 140 of the vacuum compensating valve assembly 100 and causes the diaphragm 138 to deform away from the plunger 158 which is seated on the annular end face of the magnetic core rod 146. When the diaphragm 138 is thus deformed away from the plunger 158, the plunger detaining member 174 secured to the diaphragm 138 by means of the pin 178 is brought into pressing engagement along its inwardly bent annular end portion 176 with the inner end face of the flange 166 of the stem portion of the plunger 158. This causes the plunger 158 to move with the diaphragm 138 and the plunger detaining member 174 away from the annular end face of the magnetic core rod 146 against the opposing force resulting from the magnetic field induced by the core rod 146 with the solenoid coil 152 kept energized. The valve element 172 mounted on the plunger 158 is therefore moved away from the leading end of the valve element 154 secured to the magnetic core rod 146 and allows the valve element 154 to be open at its leading end into the axial bore 160 in the plunger 158. Communication is thus provided for a second time between the atmospheric chamber 120 and the axial bore 148 in the magnetic core rod 146 of the vacuum compensating valve assembly 100 and allows atmospheric air to enter the vacuum passageway 72 leading to the vacuum chamber 56 of the exhaust recirculation rate control valve assembly 50. Atmospheric air being thus admitted into the vacuum chamber 56 of the valve assembly 50, the passage of exhaust gases through the exhaust recirculation rate control valve assembly 50 is interrupted or reduced and gives rise to an increase in the pressure of the exhaust gases in the exhaust gas recirculation passageway 46 downstream of the orifice 70. It therefore follows that the diaphragm 138 and accordingly the plunger 158 of the vacuum compensating valve assembly 100 are permitted to restore the initial positions thereof by the increased gas pressure in the exhaust gas chamber 140 of the valve assembly 100. The plunger 158 being thus seated on the annular end face of the magnetic core rod 146, the valve element 172 on the plunger 158 closes the axial bore 156 in the valve element 154 and blocks the communication between the atmospheric chamber 120 and the axial bore 148 in the magnetic core rod 146. In these manners, the supply of atmospheric air into the vacuum passageway 72 leading to the vacuum chamber 56 of the exhaust recirculation rate control valve assembly 50 is interrupted at cycles of, for example 10 to 20 hertz and thereby enables the exhaust recirculation rate control valve assembly 50 to recirculate exhaust gases at rates which are balanced with operating conditions of the engine.

As the flow rate of air through the air intake assembly 26 increases, the terminal circuit 204 of the microcomputer 186 shown in FIG. 4 delivers to the solenoid coil 152 of the vacuum compensating valve assembly 100 a current which increases with the increase in the air induction rate Q. This results in an increase in the magnetic field induced by the magnetic core rod 146 of the vacuum compensating valve assembly 100 and raises the level of the vacuum at which the diaphragm 138 of the valve assembly 100 is to be caused to deform in the direction to move the valve element 172 from the valve seat element 154 against the attractive force exerted on the plunger 158 by the magnetic core rod 146. Thus, the higher the air induction rate Q, the longer the durations for which the plunger 158 is seated on the magnetic core rod 146 and accordingly the axial bore 156 in the valve seat element 154 is closed by the valve element 172. This in turn results in the longer interruption of atmospheric air into the vacuum passageway 72 accordingly in the higher differential pressure developed across the orifice 70 in the exhaust gas recirculation passageway 46, providing the higher exhaust gas recirculation rate through the valve assembly 50.

Thus, under conditions in which the engine is capable of operating properly without having recourse to the recirculation of exhaust gases, atmospheric air is introduced into the vacuum chamber 56 of the exhaust recirculation rate control valve assembly 50 without respect to the variation in the pressure of exhaust gases. When, on the other hand, the engine is operating under conditions calling for the recirculation of exhaust gases, exhaust gases are recirculated to the mixture supply system at rates which are continuously varied with the operating conditions of the engine. Under these conditions in which exhaust gases are recirculated at controlled rates, the orifice 74 provided in the vacuum passageway 72 leading to the vacuum chamber 56 of the recirculation rate control valve assembly 50 is effective to slow down a change in the vacuum to be developed in the vacuum chamber 56 when a sudden change takes place in the vacuum in the intake manifold 28. Likewise, the orifice 180 provided in the exhaust passageway 86 leading to the exhaust gas chamber 140 of the vacuum compensating valve assembly 100 serves to slow down a change in the gas pressure or vacuum to be developed in the exhaust gas chamber 140 when a change takes place in the exhaust gas pressure or vacuum in the exhaust gas passageway 86.

From the foregoing description it will have been appreciated that an exhaust gas recirculation system according to the present invention features, inter alia, a computerized control system responsive to various operational parameters of the internal combustion engine so that exhaust gases can be recirculated to the mixture supply system of the engine at rates which are optimum for every mode of operation of the engine.

Since, furthermore, the pressure of the exhaust gases to be recirculated (viz., the exhaust gases downstream of the orifice 70) can be varied over a broad range including subatmospheric levels, exhaust gases can be recirculated efficiently even under low-speed or low-load operating conditions of the engine. For the same reason, the mechanical arrangement including the passageways 46 and 48 and the orifice 70 can be designed compactly because sufficiently high flow rate of exhaust gases therethrough can be achieved without increasing the cross sectional areas of the passageways 46 and 48 and the orifice 70.

The vacuum compensating valve assembly 100 is operated not only by the signal current supplied from the microcomputer 186 but in response to changes in the pressure of the exhaust gases in the exhaust chamber 140 of the valve assembly 100. The pressure of the exhaust gases in the exhaust gas recirculation passageway 46 downstream of the orifice 70 in turn varies with the quantities of atmospheric air passed to the vacuum passageway 72 through the vacuum compensating valve assembly 100. Thus, the exhaust gas recirculation rate can be controlled with extremely high accuracy as compared with the recirculation rate controlled in a prior-art exhaust gas recirculation system of the type illustrated in FIG. 1.

Under conditions in which recirculation of exhaust gases is not required, the recirculation rate control valve assembly 50 is held in a closed condition simply by maintaining de-energized the solenoid coil 152 of the vacuum compensating valve assembly 100. Thus, no extra devices and elements are required for cutting off the recirculation of exhaust gases under conditions not requiring the recirculation of exhaust gases.

When an exhaust gas recirculation system according to the present invention is to be applied to an internal combustion engine equipped with a microcomputer tailored to the control of ignition or fuel injection, the microcomputer may be utilized as the microcomputer 186 in the system according to the present invention by storing additional data in the former and modifying the program and control values therein. If desired, furthermore, the engine revolution speed used as one of the control parameters in the embodiment of the present invention may be substituted by vehicle speed.

While it has been assumed that the present invention is embodied in an internal combustion engine of the fuel injection type, it will be apparent that the gist of the present invention as hereinbefore described is readily applicable also to an internal combustion engine of the type using a carburetor as the mixture supply system thereof.

What is claimed is:

1. An exhaust gas recirculation system for an internal combustion engine having an air-fuel mixture supply system and an exhaust system, comprising:

exhaust gas recirculation passageway means for providing communication between the exhaust system and the mixture supply system of the engine, an exhaust recirculation rate control valve assembly provided in said passageway means, said passageway means including a flow restriction located between said valve assembly and the exhaust system of the engine, vacuum passageway means for providing communication between said mixture supply system and said valve assembly for introducing into the valve assembly a vacuum developed in the mixture supply system during operation of the engine, the valve assembly being responsive to the vacuum developed therein and being operative to control the recirculation rate of exhaust gases therethrough depending upon the relationship between the vacuum developed in the valve assembly and the exhaust gas pressure developed in said recirculation passageway means between said flow restriction and said valve assembly, a vacuum compensating valve assembly comprising a stationary solenoid unit, a valve element movable between a first position providing communication between said vacuum passageway means and the open air and a second position blocking said communication, the valve element being moved between the first and second positions as said solenoid unit is energized and de-energized, and a flexible diaphragm deformable in response to the exhaust gas pressure developed in said recirculation passageway means between said flow restriction and said recirculation rate control valve assembly, said diaphragm being engageable with said valve element for forcing the valve element to stay in said first position thereof when the exhaust gas pressure acting on the diaphragm is at a subatmospheric level, and a microcomputer electrically connected to said solenoid unit and responsive to variation in prescribed operational parameters of the engine for energizing and de-energizing the solenoid unit in accordance with the variation in said parameters.

2. An exhaust gas recirculation system as set forth in claim 1, in which said mixture supply system includes a throttle valve and in which said vacuum passageway means leads from the mixture supply system downstream of said throttle valve.

3. An exhaust gas recirculation system as set forth in claim 1 or 2, in which said vacuum compensating valve assembly further comprises a detaining member movable with said diaphragm and engageable with said valve element, said detaining member being disengaged from said valve element when the exhaust gas pressure acting on said diaphragm is at a supra-atmospheric level.

4. An exhaust gas recirculation system as set forth in claim 3, in which said vacuum compensating valve assembly further comprises a ferromagnetic plunger movable with said valve element into and out of contact with said solenoid unit as the solenoid unit is energized and de-energized, said detaining member being operative to detain said plunger in a position holding said valve element in said first position thereof when the exhaust gas pressure acting on said diaphragm is at a sub-atmospheric level.

5. An exhaust gas recirculation system as set forth in claim 4, in which said solenoid unit comprises a magnetic core member and a solenoid coil helically wound substantially in coaxial relationship to said core member, said plunger being moved into and out of contact with said core member as said solenoid coil is energized and de-energized, respectively.

6. An exhaust gas recirculation system as set forth in claim 5, in which said vacuum compensating valve assembly further comprises a tubular valve seat element axially projecting from said magnetic core member toward said valve element, said valve element being unseated and seated on said valve seat element when held in said first and second positions, respectively, thereof.

7. An exhaust gas recirculation system as set forth in claim 6, in which said magnetic core member has an axial bore communicating with said vacuum passageway and in which said valve seat element is in part securely fitted into said axial bore and formed with an axial bore having one end open to the axial bore in the core member and the other end located adjacent said valve element.

8. An exhaust gas recirculation system as set forth in claim 7, in which said plunger is formed with an axial bore open to the atmosphere, said valve seat element axially projecting into the axial bore in the plunger.

9. An exhaust gas recirculation system as set forth in claim 8, in which said plunger has a flange located and movable between said diaphragm and said valve seat element and having said valve element secured thereto.

10. An exhaust gas recirculation system as set forth in claim 9, in whch said detaining member axially extends from said diaphragm and has a turned end portion engageable with said flange of the plunger in such a manner that the turned end portion is disengaged from the flange of the plunger when said diaphragm is deformed toward the plunger.

11. An exhaust gas recirculation system as set forth in any one of claims 4 to 10, in which said vacuum compensating valve assembly further comprises biasing means urging said valve element to stay in said first position thereof.

12. An exhaust gas recirculation system as set forth in claim 1 or 2 or any one of claims 4 to 10, in which said vacuum passageway means comprises a flow restriction.

13. An exhaust gas recirculation system as set forth in claim 1 or 2 or any one of claims 4 to 10, in which said vacuum compensating valve assembly has formed therein a variable-volume exhaust gas chamber which is defined in part by said diaphragm and which is in constant communication with exhaust gas passageway means leading from said recirculation passageway means between said flow restriction and said recirculation rate control valve assembly, wherein said exhaust gas passageway means comprises a flow restriction.

14. An exhaust gas recirculation system as set forth in claim 13, in which said vacuum passageway means comprises a flow restriction.

15. An exhaust gas recirculation system as set forth in claim 1 or 2 or any one of claims 4 to 10, further comprising an engine temperature sensor for detecting the operating temperature of the internal combustion and producing an output signal representative of the detected engine temperature, an opening degree sensor for detecting the opening degree of the throttle valve provided in said mixture supply system and producing an output signal representative of the detected opening degree of the throttle valve, an engine speed sensor for detecting the number of revolutions per unit time of the output shaft of the engine and producing an output signal representative of the detected number of revolutions, and an air induction rate sensor for detecting the induction rate of air through said mixture supply system and producing an output signal representative of the detected air induction rate, said microcomputer comprising a read-in circuit responsive to pieces of information representative of said signals.

16. An exhaust gas recirculation system as set forth in claim 15, in which said microcomputer further comprises first decision gate means for determining whether or not the detected engine temperature represented by the pieces of information fed to said read-in circuit falls in a predetermined range, second decision gate means for determining whether or not the detected throttle valve opening degree represented by the pieces of information fed to said read-in circuit is larger than a predetermined value, calculating means for determining the value of the current to be supplied to the solenoid unit of said vacuum compensating valve assembly on the basis of the detected number of revolutions of the engine output shaft and the detected air induction rate represented by the pieces of information fed to said read-in circuit when the decision of each of the first and second decision gate means is in the affirmative, and means for interrupting the supply of current to the solenoid unit of said vacuum compensating valve assembly when the decision of at least one of the first and second decision gate means is in the negative.

17. An exhaust gas recirculation system as set forth in claim 16, in which said calculating means is operative to determine said value of current in terms of a value A obtained on the basis of the number of revolutions per unit time of the output shaft of the engine and a value B obtained on the basis of the air induction rate per single revolution of the engine output shaft.

* * * * *